(12) United States Patent
Newman et al.

(10) Patent No.: US 12,445,340 B2
(45) Date of Patent: Oct. 14, 2025

(54) ZERO-POWER DEMARCATION OF MESSAGE START AND END IN 5G AND 6G

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

( * ) Notice: Subject to any disclaimer, the term of this patent is extended or adjusted under 35 U.S.C. 154(b) by 0 days.

(21) Appl. No.: 18/648,352

(22) Filed: Apr. 27, 2024

(65) Prior Publication Data

US 2024/0283694 A1    Aug. 22, 2024

Related U.S. Application Data

(63) Continuation of application No. 18/215,346, filed on Jun. 28, 2023, now Pat. No. 11,996,971, which is a continuation of application No. 18/075,489, filed on Dec. 6, 2022, now Pat. No. 11,736,333, which is a continuation of application No. 17/883,915, filed on Aug. 9, 2022, now Pat. No. 11,528,178, which is a continuation of application No. 17/716,222, filed on Apr. 8, 2022, now Pat. No. 11,451,429.

(60) Provisional application No. 63/327,007, filed on Apr. 4, 2022, provisional application No. 63/321,879, filed on Mar. 21, 2022, provisional application No. 63/313,380, filed on Feb. 24, 2022, provisional application No. 63/272,352, filed on Oct. 27, 2021, provisional application No. 63/234,911, filed on Aug. 19, 2021, provisional application No. 63/220,669, filed on Jul. 12, 2021, provisional application No. 63/214,489, filed on Jun. 24, 2021, provisional application No. 63/210,216, filed on Jun. 14, 2021.

(51) Int. Cl.
     *H04L 27/34*      (2006.01)
     *H04L 1/00*      (2006.01)
     *H04L 27/20*      (2006.01)

(52) U.S. Cl.
     CPC ........ *H04L 27/3405* (2013.01); *H04L 1/0003* (2013.01); *H04L 1/0071* (2013.01); *H04L 27/20* (2013.01)

(58) Field of Classification Search
     CPC . H04L 27/3405; H04L 1/0003; H04L 1/0071; H04L 27/20
     USPC ........................................................ 375/262
     See application file for complete search history.

(56) References Cited

U.S. PATENT DOCUMENTS

2005/0068885 A1    3/2005    Becker
2005/0254344 A1    11/2005    Barras
2006/0203709 A1    9/2006    Laroia
(Continued)

*Primary Examiner* — Fitwi Y Hailegiorgis

(57) ABSTRACT

An enhanced modulation scheme for 5G and 6G is disclosed in which amplitude modulation includes a zero-power level, which is readily recognized by the receiver as a special demarcation. This can be used, for example, to unambiguously indicate the start and end of a message, such as a downlink control message, which receivers are generally stressed to detect. The zero-power level can be just one branch of a QAM symbol, or the entire symbol, in various embodiments. Advantageously, the enhanced modulation scheme increases the throughput due to the larger number of encoded states, yet requires no increase in transmission power. In some embodiments, the throughput is increased yet the transmission power is actually reduced, with no loss in SNR. Other aspects are disclosed.

20 Claims, 4 Drawing Sheets

(56) References Cited

U.S. PATENT DOCUMENTS

| | | |
|---|---|---|
| 2007/0009053 A1 | 1/2007 | Laroia |
| 2013/0330082 A1* | 12/2013 | Perez De Aranda Alonso ............ H04J 14/08 398/98 |
| 2014/0198675 A1 | 7/2014 | He |
| 2018/0324015 A1 | 11/2018 | Yi |
| 2020/0008228 A1 | 1/2020 | Lee |

* cited by examiner

FIG. 3A
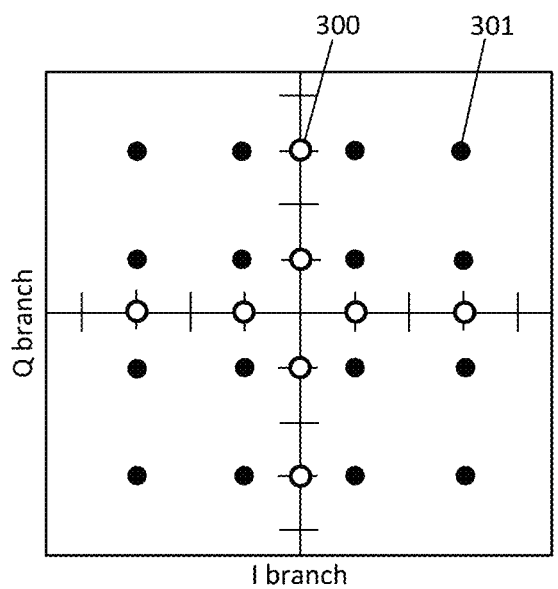
FIG. 3B
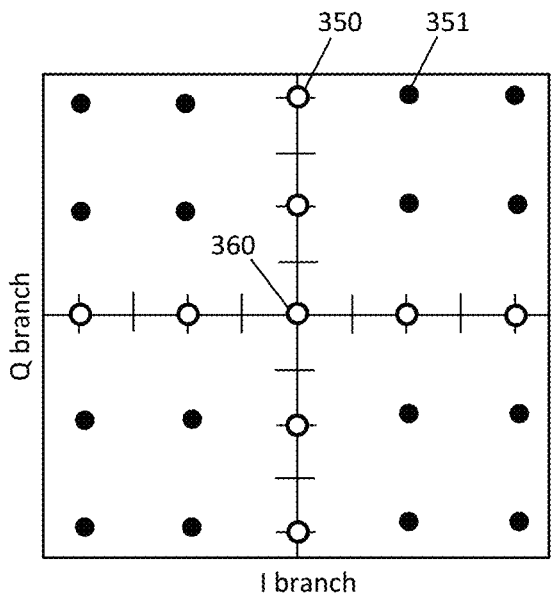
FIG. 3C
| I-branch amplitude | Q-branch amplitude | |
|---|---|---|
| 0 | 0 | — 371 |
| +3 | +3 | |
| -3 | -3 | — 372 |
| +1 | +1 | |
| +3 | -1 | |
| 0 | +1 | |
| -1 | +3 | |
| -3 | 0 | |
| -1 | -3 | |
| 0 | -3 | — 373 |
| +1 | -1 | |
| +3 | -1 | |
| 0 | +3 | |
| -1 | -1 | |
| -3 | +1 | |
| -3 | -3 | |
| +3 | +3 | — 374 |
| 0 | 0 | — 375 |
FIG. 3D
| I-branch amplitude | Q-branch amplitude | |
|---|---|---|
| 0 | 0 | — 381 |
| +4 | -4 | — 382 |
| +2 | 0 | |
| +4 | -2 | |
| 0 | +2 | |
| -2 | +4 | |
| -4 | 0 | |
| -2 | -4 | |
| 0 | -4 | — 383 |
| +2 | -2 | |
| +4 | -2 | |
| 0 | +4 | |
| -2 | -2 | |
| 0 | +2 | |
| -4 | +4 | — 384 |
| 0 | 0 | — 385 |

ZERO-POWER DEMARCATION OF MESSAGE START AND END IN 5G AND 6G

PRIORITY CLAIMS AND RELATED APPLICATIONS

This application is a continuation of U.S. patent application Ser. No. 18/215,346, entitled "Enhanced Throughput and Reliability with Zero-Power States in 5G and 6G", filed Jun. 28, 2023, which is a continuation of U.S. patent application Ser. No. 18/075,489, entitled "Information Content in Zero-Power Modulation States in 5G and 6G", filed Dec. 6, 2022, which is a continuation of U.S. patent application Ser. No. 17/883,915, entitled "Zero-Power Modulation for Resource-Efficient 5G/6G Messaging", filed Aug. 9, 2022, which is a continuation of U.S. patent application Ser. No. 17/716,222, entitled "Modulation Including Zero-Power States in 5G and 6G", filed Apr. 8, 2022, which claims the benefit of U.S. Provisional Patent Application Ser. No. 63/210,216, entitled "Low-Complexity Access and Machine-Type Communication in 5G", filed Jun. 14, 2021, and U.S. Provisional Patent Application Ser. No. 63/214,489, entitled "Low-Complexity Access and Machine-Type Communication in 5G", filed Jun. 24, 2021, and U.S. Provisional Patent Application Ser. No. 63/220,669, entitled "Low-Complexity Access and Machine-Type Communication in 5G", filed Jul. 12, 2021, and U.S. Provisional Patent Application Ser. No. 63/234,911, entitled "Short Demodulation Reference for Improved Reception in 5G", filed Aug. 19, 2021, and U.S. Provisional Patent Application Ser. No. 63/272,352, entitled "Sidelink V2V, V2X, and Low-Complexity IoT Communications in 5G and 6G", filed Oct. 27, 2021, and U.S. Provisional Patent Application Ser. No. 63/313,380, entitled "Short-Form 5G/6G Pulse-Amplitude Demodulation References", filed Feb. 24, 2022, and U.S. Provisional Patent Application Ser. No. 63/321,879, entitled "Low-Complexity Demodulation of 5G and 6G Messages", filed Mar. 21, 2022, and US Provisional Patent Application Ser. No. 63/327,007, entitled "Modulation Including Zero-Power States in 5G and 6G", filed Apr. 4, 2022, all of which are hereby incorporated by reference in their entireties.

FIELD OF THE INVENTION

The disclosure pertains modulation of wireless messages, and particularly to means for providing additional information in each modulated message element.

BACKGROUND OF THE INVENTION

Wireless messages are modulated according to a modulation scheme that includes a number of states, each state having a particular amplitude and/or phase. The information density, or bits per message element, is determined by the number of states in the modulation scheme. In a high-density wireless environment, such as an urban center or a highly instrumented factory for example, the message throughput may be limited by the information density achievable in a modulation scheme. What is needed is means for including additional information in each message element.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a wireless receiver to receive and demodulate a message, the method comprising: receiving the message; receiving or determining a modulation scheme comprising amplitude modulation according to integer Namp predetermined amplitude levels, the Namp predetermined amplitude levels comprising one zero-power amplitude level and Namp-1 non-zero-power amplitude levels; and demodulating the message according to the modulation scheme; wherein a particular amplitude level of the Namp-1 non-zero-power amplitude levels has a smallest magnitude of the Namp-1 non-zero-power amplitude levels, and the particular amplitude level is at least 10 times larger than a magnitude of the zero-power amplitude level.

In another aspect, there is a method for a wireless transmitter to modulate and transmit a message, the method comprising: using a modulation scheme comprising amplitude modulation according to integer Namp predetermined amplitude levels, the Namp predetermined amplitude levels comprising one zero-power amplitude level and Namp-1 non-zero-power amplitude levels; modulating the message according to the modulation scheme; and transmitting the modulated message; wherein the modulation scheme comprises a smallest magnitude amplitude level of the Namp-1 non-zero-power amplitude levels which is at least 10 times larger than a magnitude of an amplitude of the zero-power amplitude level.

In another aspect, there is a wireless network comprising: a base station configured to transmit wireless messages to user devices of the wireless network; a plurality of user devices, each user device registered on the wireless network through the base station; a core network associated with the base station, the core network configured to communicate with one or more other core networks remote from the wireless network; and a modulation scheme comprising amplitude modulation according to integer Namp predetermined amplitude levels, wherein Namp equals 3 or 5.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 3A is an exemplary embodiment of a constellation chart for 16 QAM+Z with PAM modulation including zero-power modulation states, according to some embodiments.

FIG. 3B is another exemplary embodiment of a constellation chart for 16 QAM+Z with PAM modulation including zero-power modulation states, according to some embodiments.

FIG. 3C is an exemplary embodiment of a frequency-spanning message modulated in 16 QAM+Z with PAM modulation including zero-power modulation states, according to some embodiments.

FIG. 3D is another exemplary embodiment of a frequency-spanning message modulated in 16 QAM+Z with PAM modulation including zero-power modulation states, according to some embodiments.

Like reference numerals refer to like elements throughout.

DETAILED DESCRIPTION

Figure 1A:
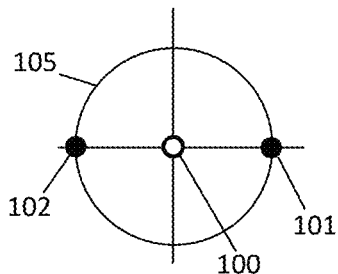
FIG. 1A is an exemplary embodiment of a phase chart for BPSK+Z including a zero-power modulation state, according to some embodiments.

Systems and methods disclosed herein (the "systems" and "methods", also occasionally termed "embodiments" or "arrangements" or "versions", generally according to present principles) can provide urgently needed wireless communication protocols to provide additional information density in messages by including zero-power modulation states in the modulation scheme. By increasing the number of modulation states available to transmitters and receivers, the size of each message may be reduced substantially, thereby mitigating high-traffic-density limitations in busy networks. Furthermore, the additional zero-power modulation states may provide the additional information density with little additional power consumption since the additional modulation states are characterized by low or zero power transmission, according to some embodiments.

Terms herein generally follow 3GPP (third generation partnership project) standards, but with clarification where needed to resolve ambiguities. As used herein, "5G" represents fifth-generation, and "6G" sixth-generation, wireless technology in which a network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period" or "symbol-time", and a specific frequency and bandwidth termed a "subcarrier" (or "sub-channel" in some references). Symbol periods may be termed "OFDM symbols" (Orthogonal Frequency-Division Multiplexing) in references. The time domain may be divided into ten-millisecond frames, one-millisecond subframes, and some number of slots, each slot including 14 symbol periods. The number of slots per subframe ranges from 1 to 8 depending on the "numerology" selected. The frequency axis is divided into "resource blocks" (also termed "resource element groups" or "REG" or "channels" in references) including 12 subcarriers, each subcarrier at a slightly different frequency. The "numerology" of a resource grid corresponds to the subcarrier spacing in the frequency domain. Subcarrier spacings of 15, 30, 60, 120, and 240 kHz are defined in various numerologies. Each subcarrier can be independently modulated to convey message information. Thus a resource element, spanning a single symbol period in time and a single subcarrier in frequency, is the smallest unit of a message. "Classical" amplitude-phase modulation refers to message elements modulated in both amplitude and phase, whereas "PAM" (pulse-amplitude modulation) refers to separately amplitude-modulating two signals and then adding them with a 90-degree phase shift. The two signals may be called the "I" and "Q" branch signals (for In-phase and Quadrature-phase) or "real and imaginary" among others. Standard modulation schemes in 5G and 6G include BPSK (binary phase-shift keying), QPSK (quad phase-shift keying), 16 QAM (quadrature amplitude modulation with 16 modulation states), 64 QAM, 256 QAM and higher orders. Most of the examples below relate to QPSK or 16 QAM, with straightforward extension to the other levels of modulation. For example, 16 QAM modulated according to PAM exhibits two phase levels at zero and 90 degrees (or in practice, for carrier suppression, ±45 degrees) and four amplitude levels including two positive and two negative, thus forming 16 distinct modulation states. For comparison, classical amplitude-phase modulation in 16 QAM includes four positive amplitude levels and four phases of the raw signal, which are multiplexed to produce the 16 states of the modulation scheme. In addition, the extremely legacy "on-off" modulation refers to transmitting message bits with amplitude modulation in which one state has zero transmission. Communication in 5G and 6G generally takes place on abstract message "channels" (not to be confused with frequency channels) representing different types of messages, embodied as a PDCCH and PUCCH (physical downlink and uplink control channels) for transmitting control information, PDSCH and PUSCH (physical downlink and uplink shared channels) for transmitting data and other non-control information, PBCH (physical broadcast channel) for transmitting information to multiple user devices, among other channels that may be in use. In addition, one or more random access channels may include multiple random access channels in a single cell. "CRC" (cyclic redundancy code) is an error-checking code. "RNTI" (radio network temporary identity) is a network-assigned user code. "SNR" (signal-to-noise ratio) and "SINR" (signal-to-interference-and-noise ratio) are used interchangeably unless specifically indicated. "RRC" (radio resource control) is a control-type message from a base station to a user device. "Digitization" refers to repeatedly measuring a waveform using, for example, a fast ADC (analog-to-digital converter) or the like. "Demodulation" of a message refers to assigning, to each message element, a number corresponding to the modulation state of the message element, thereby preparing a string of numbers representing the message elements, with which an interpreter processor can determine the message content and its meaning.

In addition to the 3GPP terms, the following terms are defined herein. Although in references a modulated resource element of a message may be referred to as a "symbol", this may be confused with the same term for a time interval ("symbol-time"), among other things. Therefore, each modulated resource element of a message is referred to as a "modulated message resource element", or more simply as a "message element", in examples below. A "demodulation reference" is a set of Nref modulated "reference resource elements" that exhibit levels of a modulation scheme (as opposed to conveying data), usually placed in close proximity to a message, such as adjacent to or concatenated with the message. Thus integer Nref is the number of reference resource elements in the demodulation reference. A "calibration set" is one or more amplitude values (and optionally phase values), which have been determined according to a demodulation reference, representing the predetermined modulation levels of a modulation scheme. Generally the modulation scheme includes integer Nlevel predetermined amplitude or phase levels. Phases are specified relative to some baseline phase, which often is selected for carrier avoidance, but will be ignored herein. Amplitudes are specified according to an arbitrary "amplitude unit". A "sum-signal" is a waveform including the combined signals from a plurality of separately modulated subcarriers. As disclosed in more detail below, a modified modulation scheme may include one or more modulation states with zero or substantially zero amplitude or transmission power (the "zero-power states") in a PAM branch or in the entire message element signal. For example, BPSK with one zero-power state may be termed "BPSK+Z" herein, while QPSK including a zero-power state is "QPSK+Z", and 16 QAM with multiple PAM-branches at zero power is "16 QAM+Z". As used herein, "substantially zero" refers to a magnitude of an amplitude or power level that is less than a predetermined fraction of other amplitudes or power level magnitudes in a message, the predetermined fraction in the list of 1%, 2%, 5%, and 10%, or between 1% and 10% inclusive. "Magnitude" means "absolute value" in mathematics. Thus a "zero-power" modulation state refers to a message element, or a branch of a PAM-modulated message element, in which the transmitted power is zero or substantially zero relative to the lowest power modulation level of the modulation scheme.

"Low-complexity" refers to devices and procedures necessary for wireless communication, exclusive of devices and procedures that provide high-performance communication. 5G/6G specifications include many procedures and requirements that greatly exceed those necessary for wireless communication, in order to provide high-performance communications at low latency and high reliability for users that demand it. Compared to scheduled and managed 5G/6G messaging, low-complexity procedures generally require less computation and less signal processing. For example, low-complexity procedures may be tailored to minimize the number of separate operations required of a device per unit of time. 5G and 6G specifications include a very wide range of options and contingencies and versions and formats and types and modes for many operations, to achieve maximum flexibility. A low-complexity specification may include defaults for each operation, and those defaults may be the simplest choices, or at least simpler than standard 5G and 6G procedures. "Simpler" procedures generally require fewer computation steps and/or smaller memory spaces than corresponding procedures in standard 5G/6G. Computation steps may be measured in floating-point calculations, for example.

"Reduced-capability" refers to wireless devices that cannot comply with 5G or 6G protocols, absent the systems and methods disclosed herein. For example, regular 5G and 6G user devices are required to receive a 5 MHz bandwidth in order to receive system information messages. Regular user devices are required to perform high-speed signal processing such as digitizing the received waveform, applying digital filtering or Fourier transforming an incoming waveform, phase-dependent integrating at several GHz frequency, and separating closely-spaced subcarriers. A reduced-capability device, on the other hand, may not need the high performance gained by such procedures, and may be incapable of performing them. A reduced-capability device may be able to receive a narrow-band wireless signal, demodulate the message, and interpret the content without further processing.

Turning now to the figures, in a first example, a zero-power modulation state is added to a BPSK modulation scheme, according to some embodiments.

FIG. 1A is an exemplary embodiment of a phase chart for BPSK+Z including a zero-power modulation state, according to some embodiments. As depicted in this non-limiting example, the states of a BPSK modulation scheme are shown on a polar plot with a large circle 105 representing a particular amplitude (such as one amplitude unit) and dots 101, 102 representing modulation states at zero degrees 101 and at 180 degrees 102 (relative to an arbitrary phase base). In addition, a central state 100, depicted as a hollow dot or bold circle, represents an additional zero-power modulation state in which the transmitted amplitude is zero, or at least substantially below the amplitude 105 of the other states. The transmitter can transmit a message of message elements in which at least one message element is modulated with, say, one unit of amplitude and another message element is modulated with zero or substantially zero amplitude. The unit of amplitude is a non-zero arbitrary amplitude by which different modulation states can be compared. Importantly, the transmitted amplitude of the zero-power state 100 is low enough that the zero-power state 100 is not confused with the non-zero-power states 101, 102.

A transmitter can modulate a message using the three states 100, 101, 102 and thereby increase the information density in the message, relative to BPSK without the zero-power state 100. Specifically, the two states 101, 102 can incorporate one binary bit of data in each message element, whereas the three modulation states 100, 101, 102 can incorporate 1.58 bits per message element. Thus a message of, say, 256 bits would require 256 message elements using BPSK, but would be reduced to just 162 message elements with BPSK+Z.

In some embodiments, the message may have a leading message element at the start of the message (that is, the first symbol-time if time-spanning, or the first subcarrier if frequency-spanning), and a trailing message element at the end of the message. For reception clarity, the leading and trailing message elements may be modulated according to one of the non-zero-power modulation states 101, 102. The intermediate message elements, between the leading and trailing message elements, may be modulated according to all three modulation states 100, 101, 102 according to the content of the message. In other embodiments, the presence of a zero-power message element at the leading or trailing position may not matter to the receiver, for example when the extent of the message in the resource grid has been previously specified or is clearly demarked by demodulation references or other means, in which case the leading and trailing message elements may be modulated according to all of the modulation states including the zero-power states. In yet other embodiments, the transmitter may insert a zero-power state before the start of the message and after the end of the message to demark the extent of the message. In still other embodiments, the transmitter may insert a zero-power state and a demodulation reference (and optionally another zero-power state) before the start of the message, and another demodulation reference and a final zero-power state at the end of the message (and optionally another zero-power state between the end of the message and the final demodulation reference).

The reduced message size may provide numerous advantages, according to some embodiments. An advantage of the reduced message size may be that the traffic density may be reduced, alleviating wireless congestion. Another advantage may be that transmitter power may be reduced, thereby extending battery life and similar savings, due to the shorter message length and also to the fact that some of the transmitted states have low or zero transmitted power. Another advantage may be that receiver power may be reduced, since a receiving user device may be able to receive and process the shorter message with less time and computation expense, and therefore may return to a DRX or hibernation state sooner, than for a larger message size lacking the zero-power state. Another advantage may be that the general background of electromagnetic radiation may be reduced, both because of the shorter message size and because some of the states involve no transmitted power. Another advantage may be reduced latency, according to some embodiments.

Another advantage may be that procedures for including zero-power modulation states may be implemented as a software (or firmware) update, without requiring new hardware development, and therefore may be implemented at low cost, according to some embodiments. The disclosed procedures may be implemented as a system or apparatus, a method, or instructions in non-transient computer-readable media for causing a computing environment, such as a user device, a base station, or other signally coupled component of a wireless network, to implement the procedure. Another advantage may be that the depicted low-complexity procedures may be compatible with devices that may have difficulty complying with complex prior-art procedures, and therefore may enable applications involving low-cost reduced-capability devices that otherwise may be unfeasible. Other advantages may be apparent to one of ordinary skill in the art, given this teaching. The advantages listed in this paragraph are also true for other embodiments described below.

Figure 1B:
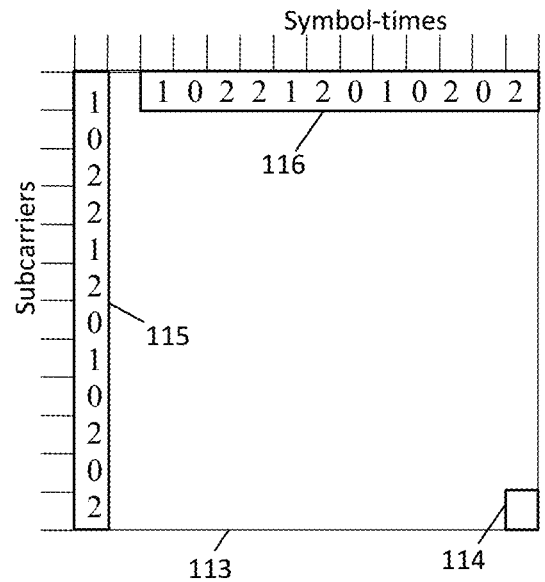
FIG. 1B is an exemplary embodiment of a resource grid including two messages modulated in BPSK+Z, according to some embodiments.

FIG. 1B is an exemplary embodiment of a resource grid including two messages modulated in BPSK+Z, according to some embodiments. As depicted in this non-limiting example, one slot of a resource grid 113 includes resource elements (one indicated as 114), defined by symbol-times horizontally and subcarriers vertically. Two messages are shown, a frequency-spanning message 115 and a time-spanning message 116, each message having 12 message elements modulated according to BPSK+Z. The individual message elements are indicated as 0, 1, 2 representing the states 100, 101, and 102 of FIG. 1A respectively. The messages 115, 116 contain the same amount of information as a regular BPSK message of 19 or 20 message elements, thereby saving time. In addition, power is transmitted on only two-thirds of the message elements, or 8 message elements in this case, whereas with regular BPSK the transmitter would need to provide power for all 19 or 20 message elements, thus saving about 57% of the transmitted power. Therefore the additional zero-power state 100 in BPSK+Z can provide substantial reductions in power, band-width (for frequency-spanning), and duration (for time-spanning) messages, according to some embodiments.

Figure 1C:
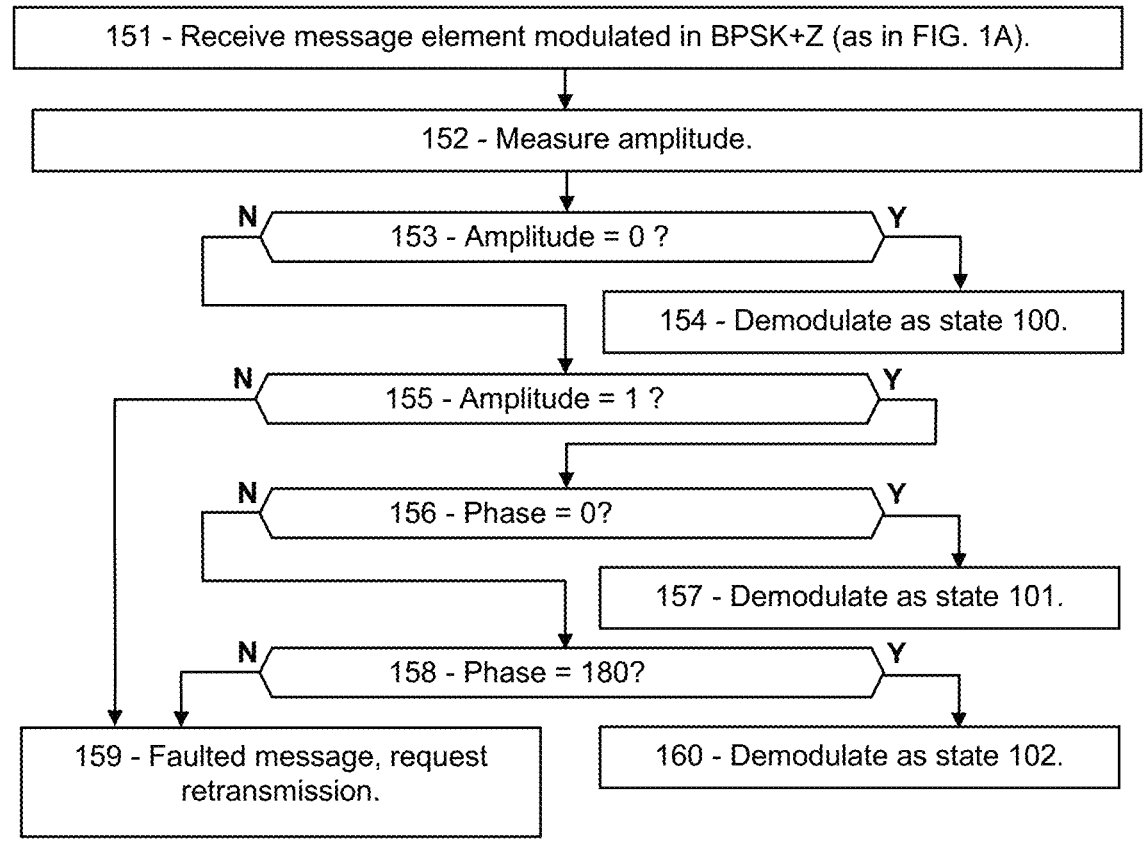
FIG. 1C is an exemplary embodiment of a flowchart for a receiver to demodulate a message modulated in BPSK+Z, according to some embodiments.

FIG. 1C is an exemplary embodiment of a flowchart for a receiver to demodulate a message modulated in BPSK+Z, according to some embodiments. As depicted in this non-limiting example, at 151 a receiver receives a message including message elements, modulated according to BPSK+Z, which is BPSK with an additional zero-power modulation state, as depicted in FIG. 1A. At 152, the receiver measures the amplitude of a particular message element (operationally, by measuring the amplitude of a received signal at a particular subcarrier frequency and a particular symbol-time in the message) and at 153 determines whether the signal amplitude is zero or substantially zero in that resource element. If so, at 154 the receiver demodulates the message element as the modulation state 100, that is, the receiver associates the message element with a number representing the modulation state 100. If not, at 155 the receiver determines whether the amplitude is 1 unit, and if so, at 156 it determines whether the phase is zero, and if so, at 157 the receiver demodulates the message element as the state 101. If the phase is not zero, at 158 the receiver determines whether the phase is 180 degrees, and if so, at 160 it demodulates the message element as the state 102. If the phase is neither zero nor 180 degrees, or if the amplitude is neither zero nor 1 unit, then at 159 the receiver declares the message faulted and requests a retransmission. Optionally, however, the receiver may try to recover the message if only one or a small number of message elements are faulted, by varying each faulted message element among all of the modulation states of the modulation scheme, and determining whether any of the resulting message versions is in agreement with a parity or error-detection code, for example. As a further option, the receiver may request the retransmission upon detecting the first faulted message element, yet continue demodulating the rest of the message, and continue varying the faulted message elements to possibly recover the message while waiting for the retransmission.

Figure 2A:
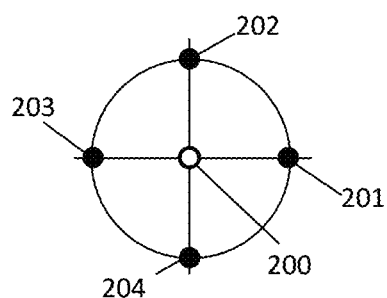
FIG. 2A is an exemplary embodiment of a phase chart for QPSK+Z including a zero-power modulation state, according to some embodiments.

FIG. 2A is an exemplary embodiment of a phase chart for QPSK+Z including a zero-power modulation state, according to some embodiments. As depicted in this non-limiting example, the states of a QPSK modulation scheme are shown as dots 201, 202, 203, 204 on a polar plot, plus a zero-power state 200. Messages modulated according to these five modulation states may be 15% shorter while carrying the same information content, relative to regular QPSK without the zero-power state 200.

Transmitters can include the zero-power state 200 in a modulated message by omitting transmission power, or optionally reducing the transmitted power to zero or substantially zero. A receiver can receive the message, separate the signals for each subcarrier and symbol-time of the message elements, determine the amplitude or power in each message element signal thus separated, and thereby determine whether a particular message element has been modulated according to the zero-power state 200.

In some embodiments, the transmitter may include one or more zero-power resource elements before and after each message, which may assist the receiver in determining where a message starts and ends. In another embodiment, each message may include a demodulation reference, such as a short-form demodulation reference, at the start and optionally at the end of each message. In some embodiments, the short-form demodulation reference at the start may include the maximum amplitude and/or phase levels of the modulation scheme, followed by the minimum amplitude and/or phase levels of the modulation scheme, thereby indicating the start of the message and enabling the receiver to calculate any intermediate amplitude or phase levels by interpolation between the maximum and minimum levels provided in the short-form demodulation reference. In some embodiments, the transmitter may provide a short-form demodulation reference at the start of the message, and a different short-form demodulation reference at the end of the message, for example providing the maximum levels followed by the minimum levels at the start of the message, and the minimum levels followed by the maximum levels at the end. In some embodiments, the transmitter may provide a gap of zero transmission before or after a short-form demodulation reference at the start of a message, and another short-form demodulation reference followed by another gap of zero power at the end, thereby assisting the receiver in recognizing the start and end of a message.

Figure 2B:
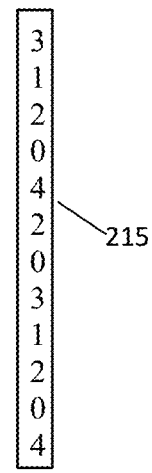
FIG. 2B is an exemplary embodiment of a frequency-spanning message modulated in QPSK+Z including a zero-power modulation state, according to some embodiments.

FIG. 2B is an exemplary embodiment of a frequency-spanning message modulated in QPSK+Z including a zero-power modulation state, according to some embodiments. As depicted in this non-limiting example, a message 215 includes multiple message elements modulated according to the QPSK+Z modulation scheme such as that of FIG. 2A, with 0 representing state 200, 1 representing state 201, and so forth. In the depicted example, the first and last message elements are non-zero-power, that is, one of the four powered states 201-204. Optionally, not shown, a zero-power resource element may be placed before and after the message to indicate the boundaries of the message.

Figure 2C:
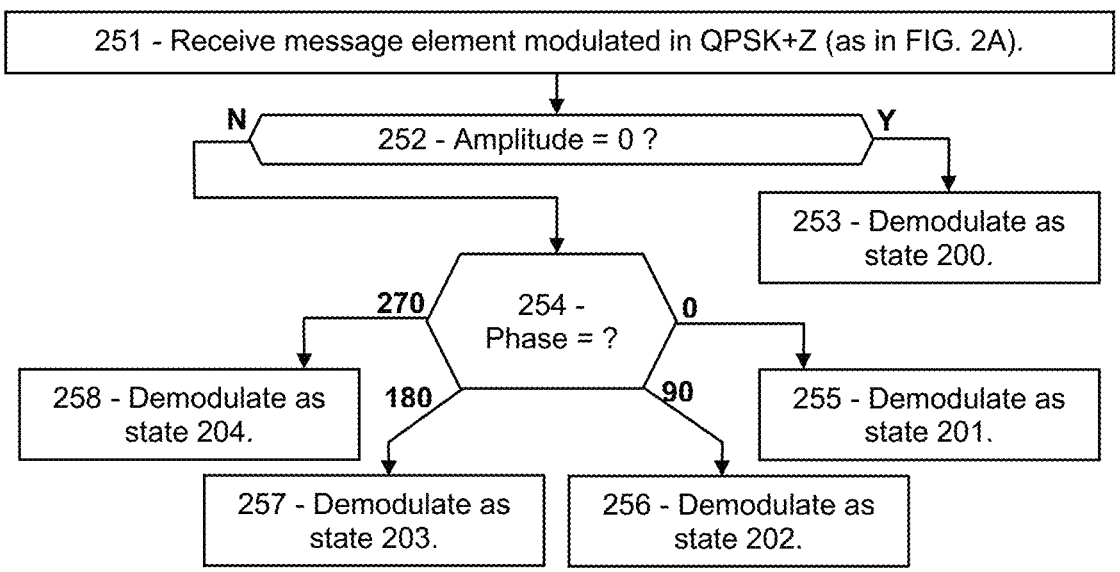
FIG. 2C is an exemplary embodiment of a flowchart for demodulating a message in QPSK+Z, according to some embodiments.

FIG. 2C is an exemplary embodiment of a flowchart for demodulating a message in QPSK+Z, according to some embodiments. As depicted in this non-limiting example, at 251 a receiver receives a message modulated as QPSK+Z, such as depicted in FIG. 2A. At 252, the receiver determines whether the amplitude of a particular message element is zero, and if so, at 253 demodulates the message element as state 200, the zero-power state. If the amplitude is not zero, the receiver measures the phase at 254, selecting among 0, 90, 180, and 270 degrees. At 255, it demodulates a phase of 0 as state 201, and at 256 it demodulates a phase of 90 as state 202, and at 257 it demodulates a phase of 180 as state 203, and at 258 it demodulates a phase of 270 as state 204.

FIG. 3A is an exemplary embodiment of a constellation chart for 16 QAM+Z with PAM modulation including zero-power modulation states, according to some embodiments. As depicted in this non-limiting example, a constellation chart shows the modulation states of a PAM-modulated scheme, in this case 16 QAM, with the I-branch amplitude horizontally and the Q-branch amplitude vertically. The axes are marked by tick marks at intervals of one amplitude unit, extending from −4 to +4 units in I and Q directions. Each dot 301 is a modulation state of regular 16 QAM, with an I-branch amplitude and a Q-branch amplitude of ±1 or ±3 units as indicated. For example, the particular state 301 corresponds to +3 units on the I branch and +3 units on the Q branch. Negative amplitude values are equivalent to a 180-degree phase shift. PAM modulation schemes generally space the branch amplitude levels apart equally, such as −3, −1, +1, +3 units as shown (and likewise for higher orders of modulation). This is to allow equal separation between the various levels, for ease of demodulation.

In addition, eight zero-power modulation states 300, indicated as hollow dots, have zero amplitude in one of the branches (but not both branches, in this example), thereby providing further modulation states at low cost. For example, the particular zero-power state 300 corresponds to +3 amplitude units on the Q branch and zero units (that is zero amplitude) on the I branch. In the depicted version, all states have at least one branch with non-zero transmission power. By modulating messages according to the 24 states depicted for 16 QAM+Z, instead of just 16 states of prior art 16 QAM, transmitters can save power by making messages shorter, and by avoiding transmitting power on each zero-power branch.

FIG. 3B is another exemplary embodiment of a constellation chart for 16 QAM+Z with PAM modulation including zero-power modulation states, according to some embodiments. As depicted in this non-limiting example, an alternative modulation scheme has 16 non-zero-power states 351 at I-branch and Q-branch amplitudes of −4, −2, +2, and +4 units as shown, and in addition has zero-power states 350 with one of the branch amplitudes at zero amplitude, and in addition includes a central state 360 with zero amplitude in both the I and Q branches.

An advantage of providing the wider amplitude distribution, relative to FIG. 3A, may be that the resulting states may remain equally spaced at −4, −2, 0, +2, +4 units as shown. An advantage of providing the central state 360 with zero amplitude in both I and Q branches, may be that this state may be reserved for special uses, such as to indicate the start and end of a message.

FIG. 3C is an exemplary embodiment of a frequency-spanning message modulated in 16 QAM+Z with PAM modulation including zero-power modulation states, according to some embodiments. As depicted in this non-limiting example, a frequency-spanning message 373 is preceded (in frequency) by a gap 371 of no transmission, and a two-point short-form demodulation reference 372. The message 373 is followed by another two-point short-form demodulation reference 374 and another gap 375. Each message element includes an I-branch amplitude and a Q-branch amplitude, separated here by a dotted line. Each of the branch amplitudes is indicated as 0, ±1, or ±3 amplitude units, such as depicted in FIG. 3A. The leading demodulation reference 372 exhibits the maximum I and Q amplitude levels followed by the minimum levels, whereas the trailing demodulation reference 374 depicts the minimum followed by the maximum levels. Messages are separated by a gap 371 or 375.

FIG. 3D is another exemplary embodiment of a frequency-spanning message modulated in 16 QAM+Z with PAM modulation including zero-power modulation states, according to some embodiments. As depicted in this non-limiting example, a message 383 modulated in 16 QAM+Z as in FIG. 3B, is surrounded by gaps 381, 385 and single-point short-form demodulation reference 382 and 384. The message elements indicate the I and Q branch amplitudes as ±4, ±2, and 0 amplitude units. The central 0,0 modulation state, such as state 360, is reserved for the gap positions 381, 385 and is not used for message modulation. The first and last message elements can be modulated as one of the other zero-power states 350 because, unlike the central state 360, they include non-zero amplitude in one of the branches, and therefore would not result in confusion as to the ends of the message.

Figure 4:
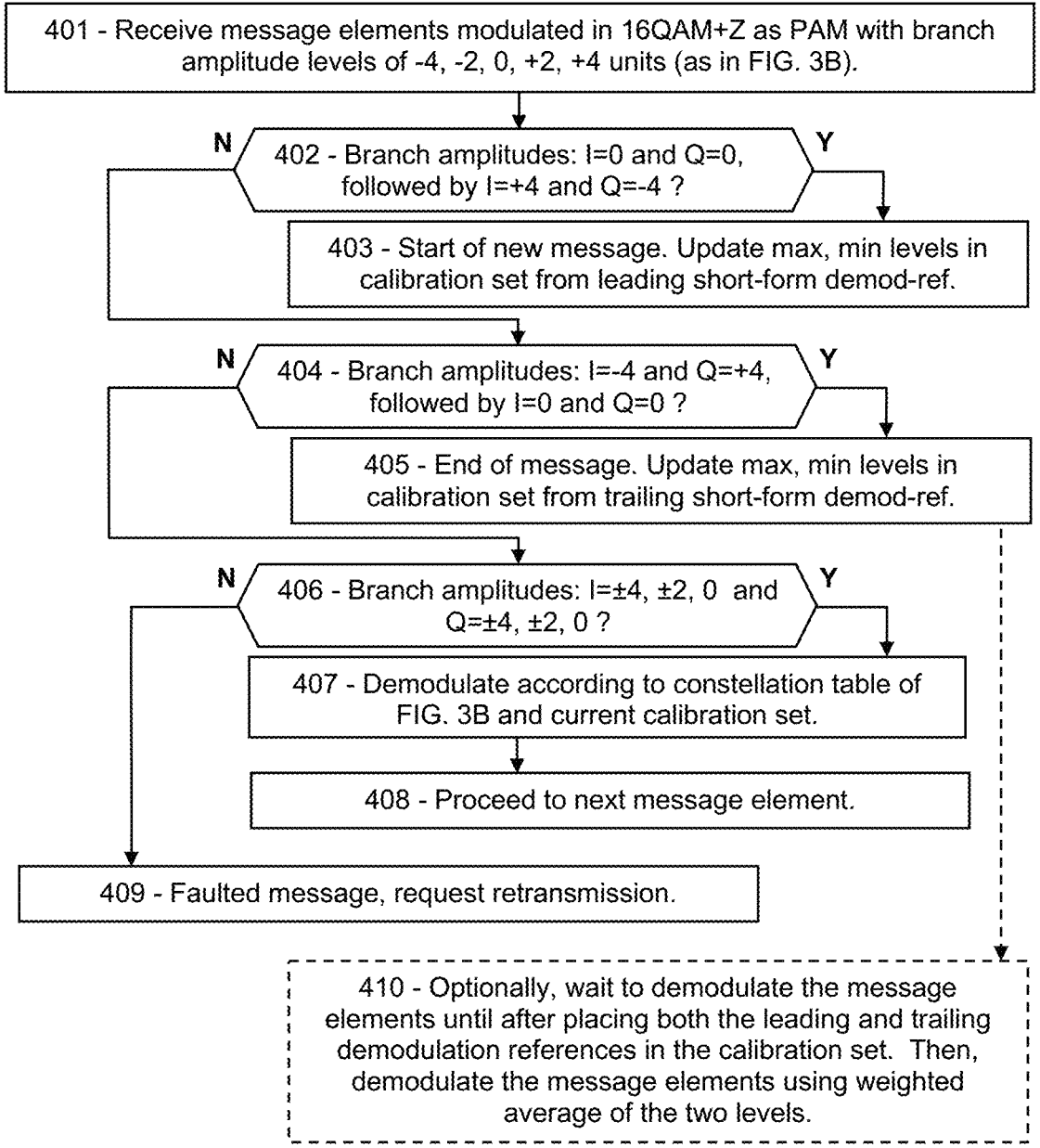
FIG. 4 is an exemplary embodiment of a flowchart for demodulating a message in 16 QAM+Z with PAM modulation, according to some embodiments.

FIG. 4 is an exemplary embodiment of a flowchart for demodulating a message in 16 QAM+Z with PAM modulation, according to some embodiments. As depicted in this non-limiting example, at 401 a receiver receives a message modulated in I and Q branches, with amplitude levels of ±4, ±2, and 0 units as depicted in FIG. 3B. At 402, the receiver determines whether the branch amplitudes of two successive resource elements are I=Q=0 and then I=+4, Q=−4 which is the signature of the start of the message including a single-point short-form demodulation reference. If so, at 403 the receiver updates the calibration set according to the branch amplitudes of the single-point short-form demodulation reference and then begins processing the message elements.

At 404, the receiver determines whether the two resource elements are modulated as I=−4, Q=+4 followed by a gap, which indicates the end of the message. If so, the receiver further updates the branch amplitudes according to the second demodulation reference.

At 406, the receiver processes each message element by determining whether the branch amplitudes have the expected values of ±4, ±2, and 0 units, usually by comparing the measured branch amplitude values to the predetermined branch amplitude levels of the calibration set. If the measured values match the predetermined levels, at 407 the receiver demodulates the message element according to the constellation table of FIG. 3B. At 408, the receiver continues demodulating the remaining message elements in the same way. However, if at 406 the measured branch amplitudes of a message element fail to agree with any of the calibration set levels, at 409 the receiver concludes that the message is faulted and requests a retransmission.

As an option 410, the receiver may measure the branch amplitudes of the message elements and store the values temporarily, and then after reaching the end of the message and processing the second demodulation reference at 405, the receiver may then do the demodulation using the updated levels of the calibration set. This may enable mitigation of noise or interference that varies from the start to the end of the message.

The disclosed systems and methods for including zero-power modulation states in a modulation scheme, when implemented in certain embodiments, can provide higher information density and higher bits per message element than prior art modulation schemes that lack the zero-power modulation states. Transmitters may thereby save time and power, both because the resulting messages are shorter (in bandwidth or in time), and also because some of the states involve low or no power emission in certain message elements (or the branches thereof, as in PAM). Receivers may also save time and power since the message duration and/or bandwidth is reduced. In addition, one of the zero-power states, such as a central state as shown, may be reserved for special purposes such as indicating the start and end of a message, for example.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touch-screen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that may be seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a wireless receiver to receive and demodulate a message, the method comprising:
  a) receiving the message;
  b) receiving or determining a modulation scheme comprising amplitude modulation according to integer Namp predetermined amplitude levels, the Namp predetermined amplitude levels comprising one zero-power amplitude level and Namp-1 non-zero-power amplitude levels; and
  c) demodulating the message according to the modulation scheme;
  d) wherein a particular amplitude level of the Namp-1 non-zero-power amplitude levels has a smallest magnitude of the Namp-1 non-zero-power amplitude levels, and the particular amplitude level is at least 10 times larger than a magnitude of the zero-power amplitude level.

2. The method of claim 1, wherein the message is transmitted according to 5G or 6G technologies.

3. The method of claim 1, wherein the modulation scheme comprises multiplexed amplitude modulation and phase modulation, the phase modulation according to integer Nphase predetermined phase levels.

4. The method of claim 1, wherein the modulation scheme comprises quadrature amplitude modulation ("QAM") comprising an I branch and a Q branch, the Q branch orthogonal in phase to the I branch, each branch of the I and Q branches independently modulated according to the Namp predetermined amplitude levels.

5. The method of claim 4, wherein the modulation scheme comprises exactly three predetermined amplitude levels comprising −1, 0, and +1 amplitude units, respectively.

6. The method of claim 4, wherein the modulation scheme comprises exactly five predetermined amplitude levels comprising −3, −1, 0, +1, and +3 amplitude units, respectively.

7. The method of claim 4, wherein the modulation scheme comprises exactly five predetermined amplitude levels comprising −4, −2, 0, +2, and +4 amplitude units, respectively.

8. The method of claim 4, wherein the modulation scheme comprises a central modulation state wherein the I branch and the Q branch are both modulated according to the zero-power amplitude level.

9. A method for a wireless transmitter to modulate and transmit a message, the method comprising:
  a) using a modulation scheme comprising amplitude modulation according to integer Namp predetermined amplitude levels, the Namp predetermined amplitude levels comprising one zero-power amplitude level and Namp-1 non-zero-power amplitude levels;
  b) modulating the message according to the modulation scheme; and
  c) transmitting the modulated message;
  d) wherein the modulation scheme comprises a smallest magnitude amplitude level of the Namp-1 non-zero-power amplitude levels which is at least 10 times larger than a magnitude of an amplitude of the zero-power amplitude level.

10. The method of claim 9, further comprising transmitting the zero-power amplitude level concatenated with a beginning of the message.

11. The method of claim 9, further comprising transmitting the zero-power amplitude level concatenated with an ending of the message.

12. The method of claim 9, further comprising transmitting a demodulation reference proximate to the message.

13. The method of claim 12, further comprising transmitting the zero-power amplitude level between the demodulation reference and the message, and concatenated with a beginning of the message.

14. The method of claim 12, further comprising transmitting the zero-power amplitude level between the demodulation reference and the message, and concatenated with an ending of the message.

15. The method of claim 9, wherein a beginning of the first modulated message comprises the zero-power amplitude level.

16. The method of claim 9, wherein an ending of the first modulated message comprises the zero-power amplitude level.

17. A wireless network comprising:
  a) a base station configured to transmit wireless messages to user devices of the wireless network;
  b) a plurality of user devices, each user device registered on the wireless network through the base station;
  c) a core network associated with the base station, the core network configured to communicate with one or more other core networks remote from the wireless network; and
  d) a modulation scheme comprising amplitude modulation according to integer Namp predetermined amplitude levels, wherein Namp equals 3 or 5.

18. The wireless network of claim 17, wherein the modulation scheme comprises an I branch and an orthogonal Q branch transmitted simultaneously with the I branch.

19. The wireless network of claim 18, wherein the modulation scheme includes at least one modulation state comprising a zero-power amplitude level in either the I branch or the Q branch, wherein the zero-power amplitude level is less than 10% of any of the other predetermined amplitude levels of the modulation scheme.

20. The wireless network of claim 19, wherein the modulation scheme includes a central modulation state wherein both the I branch and the Q branch comprise the zero-power amplitude level.

* * * * *